US008468982B2

(12) United States Patent
Johnson et al.

(10) Patent No.: US 8,468,982 B2
(45) Date of Patent: Jun. 25, 2013

(54) SYSTEMS AND METHODS FOR DISPENSING OIL AND FUEL ADDITIVES

(75) Inventors: Eric R. Johnson, Brighton, MI (US); Eric W. Schneider, Shelby Township, MI (US); Robert M. Olree, Troy, MI (US); Matthew J. Snider, Howell, MI (US); James L. Linden, Rochester Hills, MI (US); Steven P. Kemp, Canton, MI (US)

(73) Assignee: GM Global Technology Operations LLC

( * ) Notice: Subject to any disclaimer, the term of this patent is extended or adjusted under 35 U.S.C. 154(b) by 951 days.

(21) Appl. No.: 12/534,411

(22) Filed: Aug. 3, 2009

(65) Prior Publication Data

US 2010/0228400 A1 Sep. 9, 2010

Related U.S. Application Data

(60) Provisional application No. 61/158,469, filed on Mar. 9, 2009.

(51) Int. Cl.
*F02B 47/00* (2006.01)
*F02M 25/00* (2006.01)
*G05D 11/00* (2006.01)

(52) U.S. Cl.
USPC .......................................... 123/1 A; 700/283

(58) Field of Classification Search
USPC .......................... 701/101; 123/1 A; 700/283
See application file for complete search history.

(56) References Cited

U.S. PATENT DOCUMENTS

| 4,253,436 | A  | * | 3/1981  | Dudrey        | 123/198 A |
| 4,568,248 | A  | * | 2/1986  | Harders       | 417/43    |
| 4,755,289 | A  | * | 7/1988  | Villani       | 210/132   |
| 5,195,466 | A  | * | 3/1993  | Schulte et al.| 123/1 A   |
| 5,331,994 | A  | * | 7/1994  | Bryan et al.  | 137/1     |
| 5,421,295 | A  | * | 6/1995  | Lemaire et al.| 123/179.7 |
| 5,878,772 | A  | * | 3/1999  | Belyea        | 137/101.21|
| 6,938,585 | B2 | * | 9/2005  | Schneider     | 123/1 A   |
| 7,743,737 | B2 | * | 6/2010  | Valentine et al.| 123/1 A |
| 2006/0254536 | A1 | * | 11/2006 | Waters et al. | 123/1 A |
| 2007/0101969 | A1 | * | 5/2007  | Lay et al.    | 123/304 |
| 2007/0209607 | A1 | * | 9/2007  | Williams et al.| 123/1 A |
| 2008/0173358 | A1 | * | 7/2008  | Guldi         | 137/351 |
| 2008/0210611 | A1 | * | 9/2008  | Tabb et al.   | 210/153 |
| 2010/0300551 | A1 | * | 12/2010 | Yuen et al.   | 137/3   |

* cited by examiner

*Primary Examiner* — Mahmoud Gimie
*Assistant Examiner* — David Hamaoui

(57) ABSTRACT

An engine system includes a concentration determination module and an additive dispensing module. The concentration determination module determines an amount of an additive in at least one of an oil system of an engine and a fuel system of the engine. The additive dispensing module dispenses a supplemental additive into at least one of the oil system and the fuel system when the amount of the additive is less than or equal to a predetermined amount.

20 Claims, 4 Drawing Sheets

US 8,468,982 B2

SYSTEMS AND METHODS FOR DISPENSING OIL AND FUEL ADDITIVES

CROSS-REFERENCE TO RELATED APPLICATIONS

This application claims the benefit of U.S. Provisional Application No. 61/158,469, filed on Mar. 9, 2009. The disclosure of the above application is incorporated herein by reference in its entirety.

FIELD

The present disclosure relates to control systems, and more particularly to control systems for dispensing additives into oil and fuel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engine oil (hereinafter "oil") may lubricate moving components of an engine. For example, oil may lubricate pistons that reciprocate in cylinders, a crankshaft that rotates on bearings, and a camshaft that drives intake and exhaust valves. Oil may reduce friction between moving components. Accordingly, oil may reduce friction-related wear and heating in the engine. Oil may also coat metal components to inhibit corrosion.

Additives may be included in the oil to increase performance of the oil. For example, oil may include antioxidant additives that prevent the oil from thickening, friction modifier additives that increase fuel economy, and dispersant additives that hold contaminants in suspension. Oil may include anti-foam additives that inhibit the production and retention of air bubbles on the surface and in the oil. Oil may also include detergent additives that reduce deposits in the engine.

A fuel system may deliver fuel to the engine for combustion. Fuel may include additives that increase performance of the engine, maintain the fuel system, and increase fuel efficiency. Fuel additives may modify combustion temperatures and rates. Fuel additives may minimize fuel deposits in combustion chambers, intake valves, and fuel injectors. Fuel additives may also inhibit corrosion of the fuel system.

SUMMARY

An engine system comprises a concentration determination module and an additive dispensing module. The concentration determination module determines an amount of an additive in at least one of an oil system of an engine and a fuel system of the engine. The additive dispensing module dispenses a supplemental additive into at least one of the oil system and the fuel system when the amount of the additive is less than or equal to a predetermined amount.

A method comprises determining an amount of an additive in at least one of an oil system of an engine and a fuel system of the engine. The method further comprises dispensing a supplemental additive into at least one of the oil system and the fuel system when the amount of the additive is less than or equal to a predetermined amount.

BRIEF DESCRIPTION OF THE DRAWINGS

The present disclosure will become more fully understood from the detailed description and the accompanying drawings, wherein.

DETAILED DESCRIPTION

Figure 1:
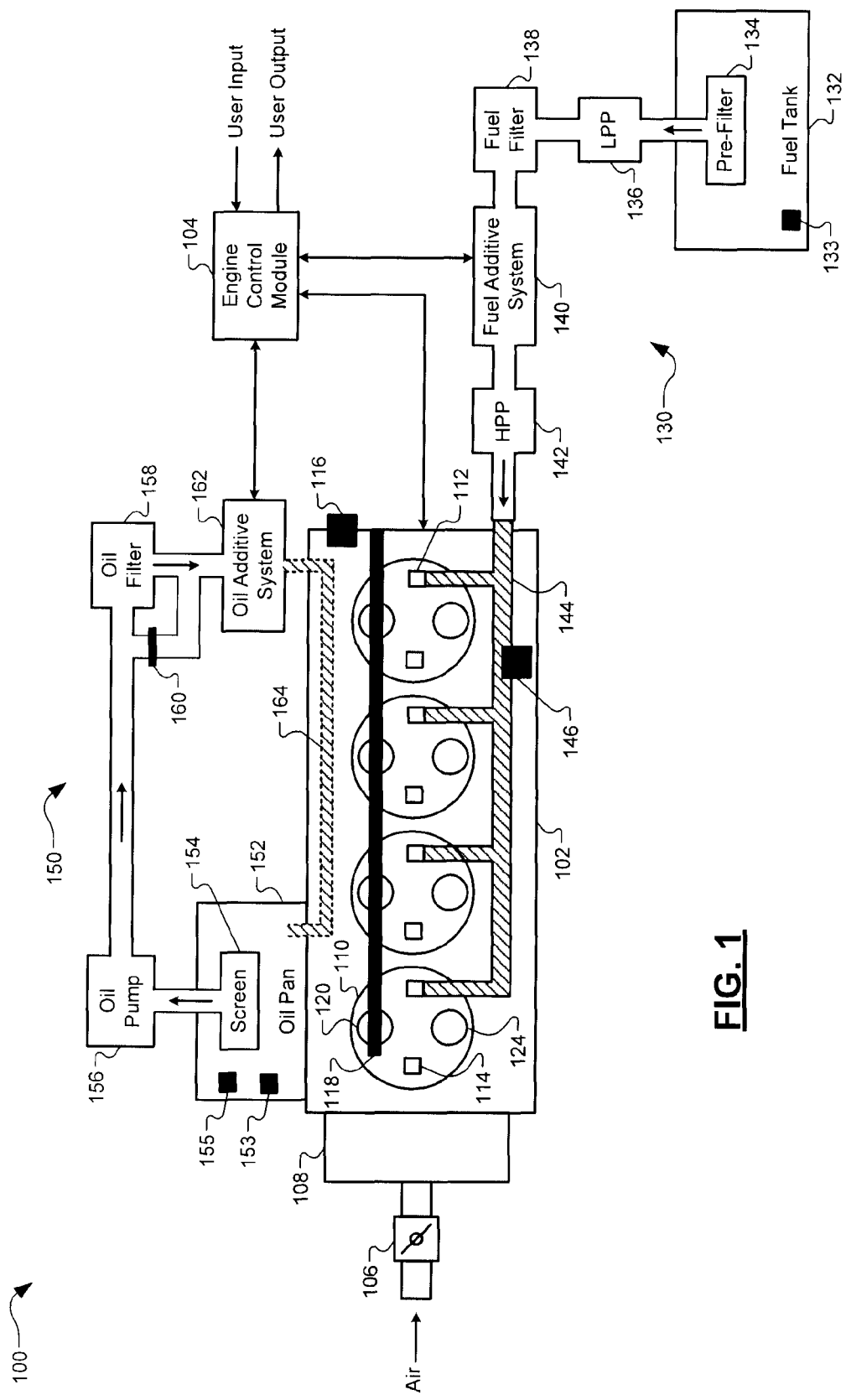
FIG. 1 is a functional block diagram of an engine system including an oil additive system and a fuel additive system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Additives may be added to engine oil to increase performance of the oil. Additives may be added to fuel to modify performance of the engine and maintain the fuel system. Fuel/oil additives may deplete during operation of the engine. Accordingly, an additive dispensing system according to the present disclosure may dispense additives into the fuel/oil to replenish depleted additives. The additive dispensing system may determine a concentration of fuel/oil additives in the fuel/oil, determine an amount of additives that have been depleted during engine operation, and dispense additives when the concentration has decreased below a concentration threshold. The system may actuate a valve of an additive container to dispense the additives into the fuel/oil. The system may be integrated into the fuel/oil filter.

Referring now to FIG. 1, an exemplary engine system 100 includes a combustion engine 102. The engine system 100 may be included in a vehicle (not shown). While a spark ignition engine is illustrated, compression ignition engines are also contemplated. An ECM 104 communicates with components of the engine system 100. The components may include the engine 102, sensors, and actuators as discussed herein. The ECM 104 may implement the additive dispensing system of the present disclosure.

The ECM 104 may actuate a throttle 106 to regulate airflow into an intake manifold 108. Air within the intake manifold 108 is distributed into cylinders 110. The ECM 104 actuates fuel injectors 112 to inject fuel into the cylinders 110. The ECM 104 may actuate spark plugs 114 to ignite an air/fuel mixture in the cylinders 110. Alternatively, the air/fuel mixture may be ignited by compression in a compression ignition engine. While four cylinders 110 of the engine 102 are shown, the engine 102 may include more or less than four cylinders 110.

An engine crankshaft (not shown) rotates at engine speed or a rate that is proportional to the engine speed. A crankshaft sensor 116 generates a crankshaft signal that indicates rotation of the crankshaft. For example only, the crankshaft sensor 116 may include at least one of a variable reluctance and a Hall-effect sensor. Rotation of the crankshaft may be sensed using other suitable methods. The ECM 104 determines the position of the crankshaft during operation of the engine 102 based on the crankshaft signal.

An intake camshaft 118 regulates a position of an intake valve 120 to enable air to enter the cylinder 110. Combustion exhaust within the cylinder 110 is forced out through an exhaust manifold (not shown) when an exhaust valve 124 is in an open position. An exhaust camshaft (not shown) regulates a position of the exhaust valve 124. Although single intake and exhaust valves 120, 124 are illustrated, the engine 102 may include multiple intake and exhaust valves 120, 124 per cylinder 110.

A fuel system 130 supplies fuel to the engine 102. Fuel may include additives that reduce fuel deposits in the engine system 100. For example, additives may minimize deposits in the cylinders 110, the fuel injectors 112, and the intake/exhaust valves 120, 124. Additionally, fuel may include friction modifier additives that may improve fuel economy. Reduced fuel deposits and improved fuel economy may lead to lower emissions of the engine system 100. The fuel may include other suitable additives to modify performance of the engine 102 and maintain the fuel system 130.

The fuel system 130 may include a fuel tank 132, a pre-filter 134, a low-pressure pump (LPP) 136, a fuel filter 138, and a fuel additive system 140. Fuel is stored in the fuel tank 132. The fuel tank 132 may include a fuel level sensor 133 that indicates the level of fuel in the fuel tank 132. The LPP 136 pumps fuel from the fuel tank 132 through the pre-filter 134. The intake camshaft 118 may drive the LPP 136. The pre-filter 134 may remove particles from the fuel before the fuel enters the LPP 136. The LPP 136 pumps fuel through the fuel filter 138. The fuel filter 138 may further filter out particles in the fuel. The fuel filter 138 may include filter paper for filtering out particles in the fuel. Fuel may flow through the fuel additive system 140 prior to injection via the fuel injectors 112.

The fuel additive system 140 may dispense additives into the fuel. For example, the fuel additive system 140 may dispense additives that reduce fuel deposits in the engine system 100. The fuel additive system 140 may also dispense friction modifier additives that may improve fuel economy. The ECM 104 may actuate the fuel additive system 140 to dispense additives into the fuel.

When the engine 102 is a direct injection engine, the fuel system 130 may include a high-pressure pump (HPP) 142, a fuel rail 144, and a pressure release valve 146. The LPP 136 provides fuel to the HPP 142. The HPP 142 pressurizes fuel for delivery to the fuel injectors 112 via the fuel rail 144. The intake camshaft 118 may drive the HPP 142 to pressurize fuel in the HPP 142. The pressure release valve 146 may release fuel from the fuel rail 144 when fuel pressure in the fuel rail 144 is greater than or equal to a fuel pressure threshold.

While the fuel additive system 140 is shown as receiving fuel from the fuel filter 138, the fuel additive system 140 may be located at other suitable locations in the fuel system 130. For example only, the fuel additive system 140 may be located between the fuel tank 132 and the pre-filter 134, between the pre-filter 134 and the LPP 136, and between the LPP 136 and the fuel filter 138. Alternatively, the fuel additive system 140 may be included in components of the fuel system 130. For example, the fuel additive system 140 may be included in the fuel filter 138.

An oil system 150 supplies oil to the engine system 100. Oil may include additives that provide benefits to the engine system 100. For example, oil may include antioxidant additives, friction modifier additives, dispersant additives, anti-foam additives, and detergent additives. The oil may include other suitable additives to increase performance of the oil and extend the life of the oil.

The oil system 150 may include an oil pan 152, a screen 154, an oil pump 156, an oil filter 158, a bypass valve 160, and an oil additive system 162. Oil is stored in the oil pan 152. The oil pan 152 may be located under the engine 102. The oil pan 152 may include an oil level sensor 153 that generates an oil level signal indicating an amount of oil in the oil pan 152. The oil pan 152 may also include an oil temperature sensor 155 that generates an oil temperature signal indicating a temperature of the oil. The ECM 104 may determine the amount of oil in the oil pan 152 and the temperature of the oil based on the oil level signal and oil temperature signal, respectively.

The oil pump 156 may pump the oil from the oil pan 152 through the screen 154. The screen 154 may include a wire mesh strainer that removes debris in the oil. The oil pump 156 may be driven by the intake camshaft 118. The oil pump 156 may pump the oil through the oil filter 158. The oil filter 158 may further remove contaminants from the oil. The bypass valve 160 may allow oil to bypass the oil filter 158 when oil pressure is greater than or equal to an oil pressure threshold. Oil may flow through the oil additive system 162 to oil galleries 164. The oil additive system 162 may dispense oil additives into the oil. From the oil galleries 164, oil may lubricate components of the engine 102 such as the crankshaft, the cylinders 110, and the intake camshaft 118. Oil dispensed from the oil galleries 164 may return to the oil pan 152.

While the oil additive system 162 is shown as receiving oil from the oil filter 158, the oil additive system 162 may be located at other suitable locations in the oil system 150. For example, the oil additive system 162 may be located between the oil pan 152 and the screen 154, between the screen 154 and the oil pump 156, and between the oil pump 156 and the oil filter 158. Alternatively, the oil additive system 162 may be included in components of the oil system 150. For example, the oil additive system 162 may be included in the oil filter 158.

The oil additive system 162 may dispense oil additives into the oil to enhance the performance and longevity of the oil and/or to replace additives that have depleted. Oil additives may deplete during operation of the engine system 100 due to combustion events, oil temperature, mileage, and passage of time. The ECM 104 may actuate the oil additive system 162 to dispense oil additives into the oil.

The ECM 104 may receive user input from a service technician and/or vehicle operator via a computer link to the ECM 104. User input may include a type and amount of fuel/oil and additive added to the engine system 100. The ECM 104 may generate user output to the service technician or vehicle operator. User output may include an indicator light that indicates a time to add more additive to the fuel/oil additive systems 140, 162. User output may also include setting a code for the service technician to read out via the computer link.

Figure 2A:
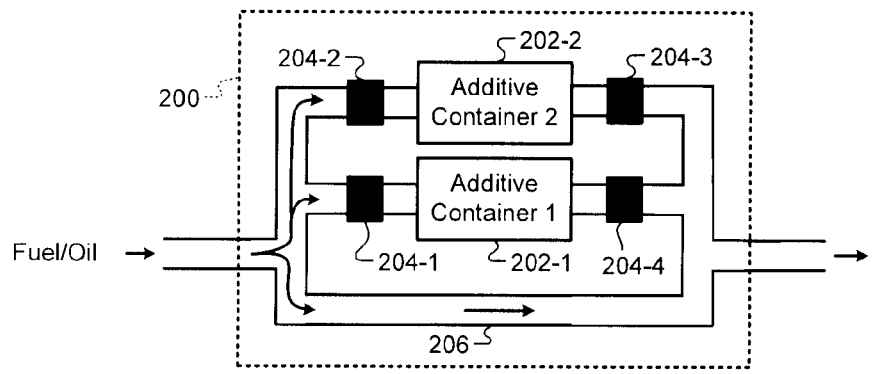
FIG. 2A is a functional block diagram of an additive system in which fuel/oil may flow through an additive container according to the present disclosure.
Figure 2B:
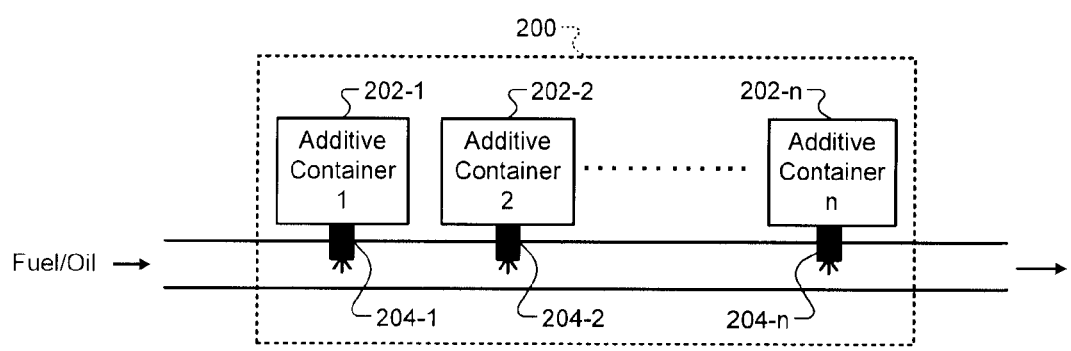
FIG. 2B is a functional block diagram of an additive system in which fuel/oil may flow past the additive containers according to the present disclosure.
Figure 2C:
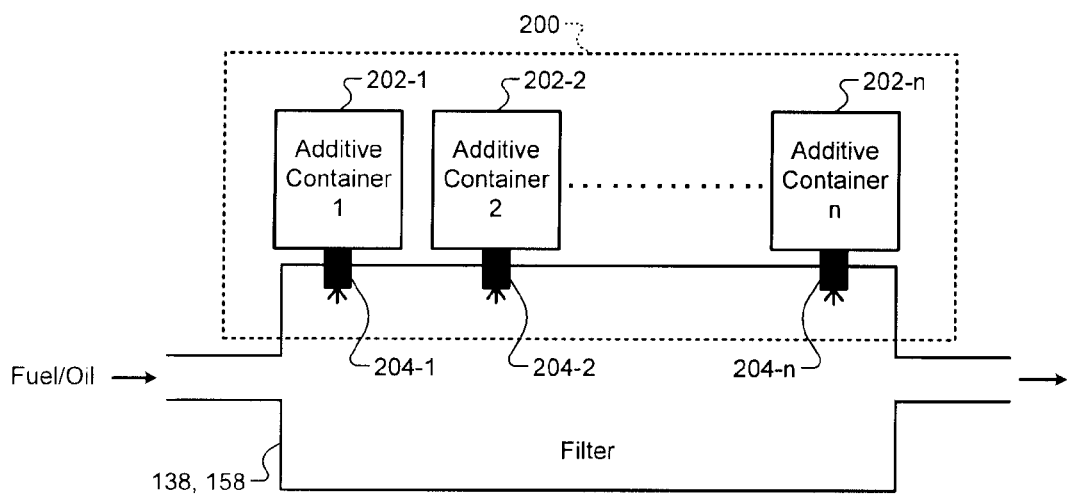
FIG. 2C is a functional block diagram of an additive system that is integrated into a filter according to the present disclosure.

Referring now to FIGS. 2A-2C, different configurations of the fuel/oil additive systems 140, 162 (collectively "additive systems 200") are shown. The additive systems 200 may include one or more additive containers 202-1, 202-2, . . . , and 202-n (hereinafter "additive containers 202") that store fuel/oil additives. Fuel and oil additives may be collectively called "additives." The additives stored in the additive containers 202 may include at least one of a liquid form and a solid form. When the additive includes a liquid form, the liquid form may have a range of viscosities.

The ECM 104 may actuate additive valves 204-1, 204-2, 204-3, 204-4, . . . , and 204-n (hereinafter "additive valves 204") to dispense the additives included in the additive containers 202. While three exemplary configurations of additive systems 200 are shown in FIGS. 2A-2C, other configurations may be implemented.

In FIG. 2A, the ECM 104 may actuate the additive valves 204 (e.g., 204-1 and 204-4) to open to allow fuel/oil to flow through the corresponding additive containers 202 (e.g., 202-1). The additive in the additive containers 202 may be incorporated into (e.g., mixed with) the fuel/oil when the fuel/oil flows through the additive containers 202.

The additive containers 202 may include solid and/or liquid additives. An amount of additive added to the fuel/oil may depend on a period of time for which the additive valves 204 are open. When the ECM 104 actuates the additive valves 204 to close, the fuel/oil may bypass the additive containers 202 via a bypass line 206.

While the additive system 200 of FIG. 2A includes two additive containers 202 connected in parallel with the bypass line 206, the additive system 200 may include more or less than two additive containers 202 connected in parallel. Each additive container 202 may include a different additive. Accordingly, the ECM 104 may actuate the additive valves 204 to selectively add different additives to the fuel/oil.

In FIG. 2B, the fuel/oil may flow past the additive containers 202. Each additive container 202 of FIG. 2B may include a different additive. The ECM 104 may actuate the additive valves 204 to selectively add the different additives to the fuel/oil. The additive containers 202 may include solid and/or liquid additives.

The ECM 104 may actuate the additive valves 204 to dispense solid additive from the additive containers 202 when the additive is a solid. Solid additive may include powdered additive or a slug of additive. The ECM 104 may actuate the additive valves 204 to dispense liquid from the additive containers 202 when the additive is a liquid. In the oil system 150, the liquid additive may include oil mixed with additives. The additive containers 202 may dispense liquid under pressure. For example, the ECM 104 may actuate a pressure source (not shown) such as a pump to inject liquid additive into the fuel/oil. The liquid additive may have a range of viscosities.

In FIG. 2C, the additive system 200 may be included in components of the engine system 100. For example, the additive system 200 may be included in the fuel/oil filters 138, 158. When the additive system 200 is incorporated in the fuel/oil filters 138, 158, the additive containers 202 may inject additives directly into the fuel/oil filters 138, 158. Incorporation of the additive system 200 in the fuel/oil filters 138, 158 may allow the additive system 200 to be easily serviced and filled with additive.

The additive containers 202 may include level sensors (not shown) that generate additive level signals indicating of an amount of additive remaining in the additive containers 202. The ECM 104 may determine an amount of additive remaining in the additive containers 202 based on the additive level signals. Alternatively, the ECM 104 may determine the amount of additive remaining in the additive containers 202 based on open loop control. For example, the ECM 104 may determine an initial amount of additive in the additive containers 202, then determine a current amount of additive in the additive containers 202 based on amount of additive added according to actuation of the additive valves 204.

Figure 3:
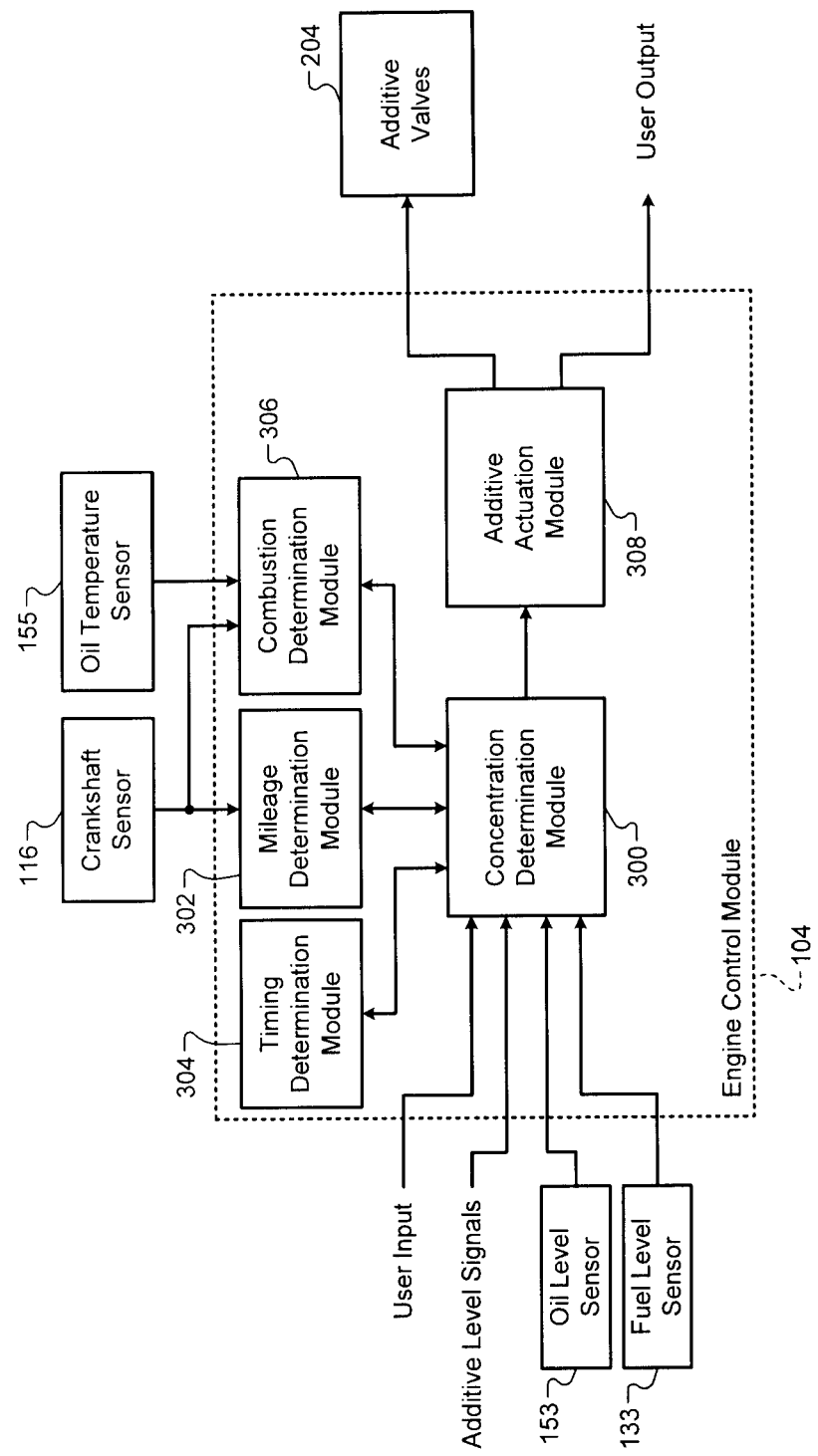
FIG. 3 is a functional block diagram of an engine control module according to the present disclosure.

Referring now to FIG. 3, the ECM 104 includes a concentration determination module 300, a mileage determination module 302, a timing determination module 304, a combustion determination module 306, and an additive actuation module 308. The concentration determination module 300 determines a concentration of additives in the oil/fuel. The mileage determination module 302 may determine an amount of additives depleted based on the mileage of the vehicle. The timing determination module 304 may determine an amount of additives depleted based on a period of time. For example, the timing determination module 304 may determine the amount of additives depleted based on a time the engine 102 has operated while the temperature of the oil is greater than a predetermined temperature. The combustion determination module 306 may determine an amount of additives depleted based on combustion events in the engine 102. For example, the combustion determination module 306 may determine an amount of additives depleted based on a number of combustion events in the engine 102 when the temperature of the oil is greater than the predetermined temperature. The additive actuation module 308 may actuate the additive valves 204 to dispense additives into the fuel/oil to compensate for the amount of additives depleted due to mileage, time the engine 102 has operated, and combustion events.

For example, anti-oxidants may be depleted from the oil at a higher rate when the engine 102 is operated while the temperature of the oil is greater than the predetermined temperature. Accordingly, the additive actuation module 308 may actuate the additive valves 204 to dispense anti-oxidant additives into the oil when the engine 102 is operated while the temperature of the oil is greater than the predetermined temperature. As a further example, components of the vehicle may experience more wear when the engine 102 is operated while the temperature of the oil is less than the predetermined temperature. Accordingly, the additive actuation module 308 may actuate the additive valves 204 to dispense anti-wear additives into the oil when the engine 102 is operated while the temperature of the oil is less than the predetermined temperature.

The concentration determination module 300 determines a concentration of additives in the fuel/oil (hereinafter "concentration"). The concentration determination module 300 may determine the concentration based on at least one of a user input, an amount of additive remaining in the additive containers 202, oil level sensor signals, and fuel level sensor signals. A user, such as a service technician and/or vehicle operator, may enter user input into the concentration determination module 300 via the computer link to the ECM 104. For example, user input may include information regarding an oil change, such as a type and amount of oil added to the system. User input may also include a type and amount additives present in oil added to the engine system 100. The concentration determination module 300 may determine that the concentration has increased when user input indicates that new fuel/oil has been added to the engine system 100 since new fuel/oil may include a higher concentration of additives than used fuel/oil.

The concentration determination module 300 may determine the concentration based on the amount of additive remaining in the additive containers 202. For example, the concentration determination module 300 may determine an amount of additive that has been dispersed into the fuel/oil based on additive level signals. The concentration determination module 300 may also determine concentration using open loop control. For example, the concentration determination module 300 may determine the concentration based on a number of times the additive actuation module 308 has actuated the additive valves 204 to dispense additives.

The concentration determination module 300 may determine the concentration based on the level of the fuel/oil as indicated by the fuel/oil level sensors 133, 153. For example, the concentration determination module 300 may determine the concentration based on an amount of additives dispensed into the total amount of oil in the oil system 150.

The mileage determination module 302 may determine an amount of additives depleted based on a change in mileage of the vehicle. The mileage determination module 302 may receive the concentration from the concentration determination module 300. The mileage determination module 302 may determine a number of miles the vehicle has operated since receiving the concentration. For example, the mileage determination module 302 may determine the number of miles based on the crankshaft signal.

The mileage determination module 302 may determine an amount of additives depleted from the fuel/oil since receiving the concentration from the concentration determination module 300. The mileage determination module 302 may determine the amount of additives depleted from the fuel/oil based on a fuel/oil model that relates parameters of the fuel/oil to mileage of the vehicle using the fuel/oil. For example, an oil model may be based on measured oil parameters over a range of engine operating conditions. Oil parameters may include, but are not limited to, acidity, viscosity, and particle concentration. Engine operating conditions may include, but are not limited to, engine revolutions, engine temperature, coolant temperature, and oil temperature. The mileage determination module 302 may update the concentration based on the amount of additives depleted due to mileage. The mileage determination module 302 may output the updated concentration to the concentration determination module 300.

The timing determination module 304 determines the amount of additives depleted based on an engine operating period. The timing determination module 304 may receive the concentration from the concentration determination module 300. The timing determination module 304 may determine the engine operating period based on an amount of time the engine system 100 has operated since receiving the concentration from the concentration determination module 300. The timing determination module 304 may determine the amount of additives depleted during the engine operating period based on the fuel/oil model. The timing determination module 304 may update the concentration based on the amount of additives depleted due to the passage of time. The timing determination module 304 may output the updated concentration to the concentration determination module 300.

The combustion determination module 306 may determine the amount of additives depleted based on a number of combustion events in the engine 102 and the temperature of the oil during the combustion events. The combustion determination module 306 may receive the concentration from the concentration determination module 300. The combustion determination module 306 may determine the amount of additives depleted in the fuel/oil based on combustion events that occur after receiving the concentration from the concentration determination module 300.

For example, combustion events may include combustion of the air/fuel mixture in a cylinder 110. The combustion determination module 306 may determine a number of combustion events based on the crankshaft signal. The combustion determination module 306 may also monitor the oil temperature signals to determine oil temperature during the combustion events. The combustion determination module 306 may determine the amount of additives depleted due to combustion events based on the fuel/oil model, the number of combustion events, and the oil temperature. The ECM 104 may disable fuel injection and spark to one or more cylinders 110 to deactivate the one or more cylinders 110. The combustion determination module 306 may determine that deactivated cylinders may not generate combustion events. The combustion determination module 306 may update the concentration based on the amount of additives depleted due to combustion events. The combustion determination module 306 may output the updated concentration to the concentration determination module 300.

The concentration determination module 300 may determine the concentration based on the updated concentrations received from the timing determination module 304, the mileage determination module 302, and the combustion determination module 306. The concentration determination module 300 may instruct the additive actuation module 308 to increase the concentration of additives in the fuel/oil when the concentration determination module 300 determines that the concentration is less than the concentration threshold.

The additive actuation module 308 may actuate the additive valves 204 of the additive system 200 to dispense additive into the fuel/oil to increase the concentration of additives in the fuel/oil. The additive actuation module 308 may apply a voltage and/or current to the additive valves 204 to actuate the additive valves 204 to dispense the additives into the fuel/oil. The additive actuation module 308 may actuate the additive valves 204 for a predetermined period to dispense a predetermined amount of additive.

The additive actuation module 308 may provide user output when the concentration is less than the concentration threshold and additive is not available in the additive containers 202. The additive actuation module 308 may determine that additive is not available in the additive containers 202 based on the additive level signals. The additive actuation module 308 may also determine that additive is not available in the additive containers 202 based on a number of times the additive actuation module 308 has actuated the additive valves 204. User output may include setting a code to notify a service technician that additive is not available in the additive containers 202. User output may also include setting an indicator light to notify a vehicle operator that additive is not available in the additive containers 202. Alternatively, the user output may indicate that the amount of additive remaining in the additive containers 202 is less than or equal to an additive threshold.

Figure 4:
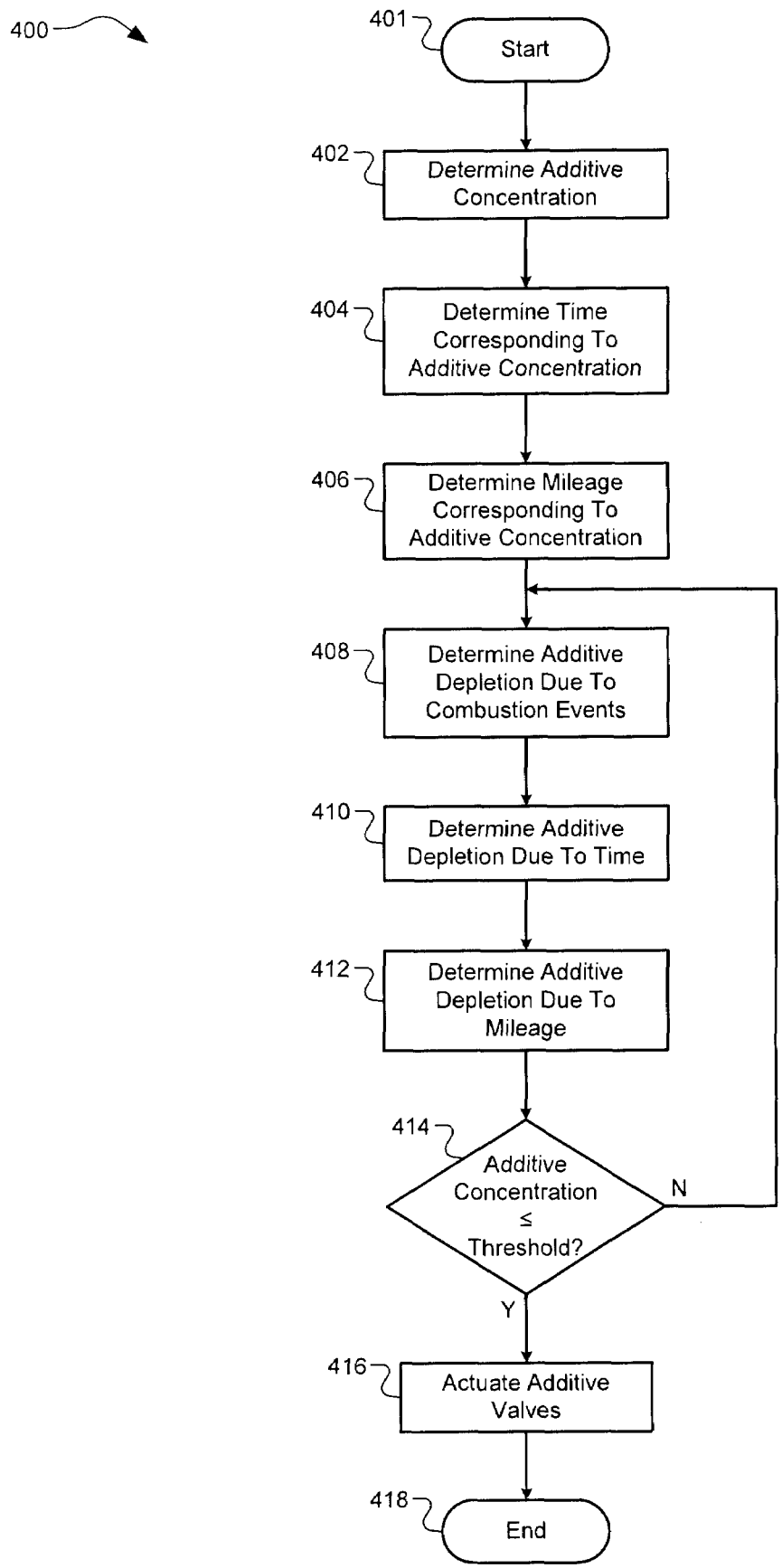
FIG. 4 illustrates a method for dispensing additives according to the present disclosure.

Referring now to FIG. 4, a method 400 for dispensing additives starts in step 401. In step 402, the concentration determination module 300 determines the additive concentration in the fuel/oil. In step 404, the timing determination module 304 determines the time corresponding to when the concentration determination module 300 determined the additive concentration in the fuel/oil. In step 406, the mileage determination module 302 determines the mileage corresponding to when the concentration determination module 300 determined the additive concentration in the fuel/oil.

In step 408, the combustion determination module 306 determines the amount of additives depleted due to combustion events. In step 410, the timing determination module 304 determines the amount of additives depleted during the engine operating period. In step 412, the mileage determination module 302 determines the amount of additives depleted due to mileage. In step 414, the concentration determination module 300 determines whether the additive concentration is less than or equal to the concentration threshold. If the result of step 414 is false, the method 400 continues with step 408. If the result of step 414 is true, the method 400 continues with step 416. In step 416, the additive actuation module 308 actuates the additive valves 204 to dispense additive into the fuel/oil. The method 400 ends in step 418.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine system of a vehicle, comprising:
a concentration determination module that determines an amount of an additive in one of oil in an oil system of an engine and fuel in a fuel system of the engine based on user input, an amount of the additive stored in an additive container, and a level of the one of the oil and the fuel; and
an additive dispensing module that dispenses supplemental additive from the additive container into the one of the oil system and the fuel system when the amount of the additive is less than or equal to a predetermined amount.

2. The engine system of claim 1, wherein when the supplemental additive is dispensed into the oil system, the supplemental additive includes at least one of an antioxidant additive, a friction modifier additive, a dispersant additive, an anti-foam additive, and a detergent additive.

3. The engine system of claim 1, wherein when the supplemental additive is dispensed into the fuel system, the supplemental additive includes at least one of an additive that modifies a temperature and rate of combustion in the engine, an additive that controls fuel deposits in combustion chambers of the engine, and an additive that inhibits corrosion of the fuel system.

4. The engine system of claim 1 further comprising an additive container and a valve, wherein the additive container includes the supplemental additive, and wherein the valve isolates the supplemental additive in the additive container from the one of the oil in the oil system and the fuel in the fuel system.

5. The engine system of claim 4, wherein the additive dispensing module actuates the valve to dispense the supplemental additive into the one of the oil in the oil system and the fuel in the fuel system.

6. The engine system of claim 5, wherein the additive dispensing module actuates the valve to dispense the supplemental additive into one of an oil filter of the oil system and a fuel filter of the fuel system.

7. A method for a vehicle, comprising:
determining, by a concentration determination module, an amount of an additive in one of oil in an oil system of an engine and fuel in a fuel system of the engine based on user input, an amount of the additive stored in an additive container, and a level of the one of the oil and the fuel; and
dispensing, by an additive dispensing module, supplemental additive from the additive container into at least the one of the oil system and the fuel system when the amount of the additive is less than or equal to a predetermined amount.

8. The method of claim 7 wherein the supplemental additive includes at least one of an antioxidant additive, a friction modifier additive, a dispersant additive, an anti-foam additive, and a detergent additive when dispensing the supplemental additive into the oil system.

9. The method of claim 7 wherein the supplemental additive includes an additive for at least one of modifying a temperature and rate of combustion in the engine, an additive for controlling fuel deposits in combustion chambers of the engine, and an additive for inhibiting corrosion of the fuel system.

10. The method of claim 7 further comprising:
storing the supplemental additive in an additive container; and
isolating the supplemental additive in the additive container from the one of oil in the oil system and the fuel in the fuel system using a valve.

11. The method of claim 10 further comprising actuating the valve to dispense the supplemental additive into the one of the oil in the oil system and the fuel in the fuel system.

12. The method of claim 11 further comprising actuating the valve to dispense the supplemental additive into one of an oil filter of the oil system and a fuel filter of the fuel system.

13. The method of claim 7 further comprising:
determining a first amount of the additive depleted based on a distance of operation of the vehicle after addition of the additive; and
updating the amount of the additive in the one of the oil and the fuel based on the first amount.

14. The method of claim 7 further comprising:
determining a second amount of the additive depleted based on a period of operation of the engine after addition of the additive; and
updating the amount of the additive in the one of the oil and the fuel based on the second amount.

15. The method of claim 7 further comprising:
determining a third amount of the additive depleted based on a number of combustion events of the engine after addition of the additive; and
updating the amount of the additive in the one of the oil and the fuel based on the third amount.

16. The method of claim 7 further comprising:
determining a first amount of the additive depleted based on a distance of operation of the vehicle after addition of the additive;
determining a second amount of the additive depleted based on a period of operation of the engine after the addition of the additive;
determining a third amount of the additive depleted based on a number of combustion events of the engine after the addition of the additive; and
updating the amount of the additive in the one of the oil and the fuel based on the first amount, the second amount, and the third amount.

17. The engine system of claim 1 further comprising a mileage determination module that determines a first amount of the additive depleted based on a distance of operation of the vehicle after addition of the additive,
wherein the concentration determination module updates the amount of the additive in the one of the oil and the fuel based on the first amount.

18. The engine system of claim 1 further comprising a timing determination module that determines a second amount of the additive depleted based on a period of operation of the engine after addition of the additive,
wherein the concentration determination module updates the amount of the additive in the one of the oil and the fuel based on the second amount.

19. The engine system of claim 1 further comprising a combustion determination module that determines a third amount of the additive depleted based on a number of combustion events of the engine after addition of the additive,
   wherein the concentration determination module updates the amount of the additive in the one of the oil and the fuel based on the third amount.

20. The engine system of claim 1 further comprising:
   a mileage determination module that determines a first amount of the additive depleted based on a distance of operation of the vehicle after addition of the additive;
   a timing determination module that determines a second amount of the additive depleted based on a period of operation of the engine after addition of the additive; and
   a combustion determination module that determines a third amount of the additive depleted based on a number of combustion events of the engine after addition of the additive,
   wherein the concentration determination module updates the amount of the additive in the one of the oil and the fuel based on the first amount, the second amount, and the third amount.

\* \* \* \* \*